United States Patent
Kim et al.

(10) Patent No.: US 10,951,029 B2
(45) Date of Patent: Mar. 16, 2021

(54) POWER SOURCE INPUT DEVICE FOR BOTH AC AND DC POWER SOURCES

(71) Applicant: LG Electronics Inc., Seoul (KR)

(72) Inventors: Kyung Min Kim, Seoul (KR); Joonsik An, Seoul (KR)

(73) Assignee: LG Electronics Inc., Seoul (KR)

( * ) Notice: Subject to any disclaimer, the term of this patent is extended or adjusted under 35 U.S.C. 154(b) by 186 days.

(21) Appl. No.: 16/132,710

(22) Filed: Sep. 17, 2018

(65) Prior Publication Data

US 2019/0089156 A1 Mar. 21, 2019

(30) Foreign Application Priority Data

Sep. 19, 2017 (KR) .................. 10-2017-0120383

(51) Int. Cl.
*H02J 3/02* (2006.01)
*F24F 11/88* (2018.01)
*H03M 1/10* (2006.01)
*H02M 1/10* (2006.01)

(52) U.S. Cl.
CPC .............. *H02J 3/02* (2013.01); *F24F 11/88* (2018.01); *H02M 1/10* (2013.01)

(58) Field of Classification Search
CPC .............. H02J 3/02; H02M 1/10; F24F 11/88
USPC ................................. 307/2, 37, 71
See application file for complete search history.

(56) References Cited

U.S. PATENT DOCUMENTS

| 8,340,932 B2 * | 12/2012 | Ichikawa | ............ H01M 10/482 |
| | | | 702/63 |
| 2012/0209441 A1 * | 8/2012 | Hirata | ................ H02J 1/14 |
| | | | 700/292 |
| 2013/0057070 A1 * | 3/2013 | Onishi | ............ G06K 19/0715 |
| | | | 307/43 |
| 2017/0292728 A1 * | 10/2017 | Ushirosako | ....... G05D 23/1932 |

FOREIGN PATENT DOCUMENTS

| JP | 2004-053149 | 2/2004 |
| KR | 10-1997-000877 | 1/1997 |
| KR | 10-2011-0026306 | 3/2011 |
| KR | 10-2013-0078964 | 7/2013 |
| KR | 10-2016-1642235 | 7/2016 |
| KR | 10-2016-0097865 | 8/2016 |

* cited by examiner

*Primary Examiner* — Michael R. Fin
(74) *Attorney, Agent, or Firm* — Finnegan, Henderson, Farabow, Garrett & Dunner LLP

(57) ABSTRACT

A power source input device for both AC/DC power sources includes a first power source input unit that is provided at a power source input terminal of an electric power device to convert an AC or DC commercial power source selectively input from the outside into a DC driving power source and supply the converted DC driving power source to an accessory device. A second power source input unit is provided in the accessory device to supply the DC driving power source supplied from the first power source input unit to at least one load, thereby simplifying a configuration of a power source input terminal of each of the electric power devices and reducing a manufacturing cost thereof.

6 Claims, 9 Drawing Sheets

POWER SOURCE INPUT DEVICE FOR BOTH AC AND DC POWER SOURCES

CROSS-REFERENCE TO RELATED APPLICATION

This application claims priority under 35 U.S.C. § 119 to Korean Application No. 10-2017-0120383, filed on Sep. 19, 2017, whose entire disclosure is herein incorporated by reference.

BACKGROUND

1. Field of the Invention

The present disclosure relates to a power source input device for both alternating current (AC) and direct current (DC) power sources that is provided at power source input terminals of electric power devices of a consumer so as to allow each of the electric power devices to selectively receive an AC or DC commercial power source and use the received power source as a driving power source.

2. Description of Related Art

Consumers such as general households, offices, government offices, industrial sites, and the like receive a system power source of a power supply station via a switchboard and use it as a commercial power source for home appliances, office appliances, industrial appliances, and the like. Recently, an energy storage system (ESS) using solar power has been utilized, and electric power stored in the ESS that is provided in the consumer is used as a commercial power source together with the system power source.

Most electric power devices which are provided in the current consumers, i.e., home appliances, office appliances, industrial appliances and the like, are designed to use an alternating current power source input through the switchboard as a commercial power source (hereinafter, referred to as an AC power source). That is, most electric power devices receive an AC power source through a power source input terminal, and allow a voltage level thereof to be varied or converted into a direct current power source (DC power source) for use. The switchboard of each consumer also converts the system electric power as well as the DC power source stored in the ESS into an AC power source and supplies the AC power source to each consumer.

The electric power devices of most consumers use a DC power source as a driving power source or selectively use a DC power source or an AC power source depending on an internal device. Therefore, an AC/DC converter is additionally provided in accordance with an environment where an AC switchboard supplies an AC power source as a commercial power source.

When each of the electric power devices receives a DC power source as a commercial power source and uses the DC power source without conversion, it is possible to further improve its electric power use efficiency. However, in an environment where an AC power source is supplied as a commercial power source, an AC voltage level converter for varying a voltage level of the AC power source, an AC/DC converter, a DC/DC converter and the like have to be provided at the power source input terminal.

FIG. 1 is a block diagram illustrating an AC power source input structure of a home appliance according to the related art.

Referring to FIG. 1, among the home appliances that receive an AC power source as a commercial power source through an AC switchboard 200, an air conditioner includes an indoor unit 40 and an outdoor unit 30, and thus receives an AC commercial power source through any one of the indoor unit 40 and the outdoor unit 30. The indoor unit 40 and the outdoor unit 30 are configured to share the AC commercial power in series/parallel with each other.

At this time, the indoor unit 40 of the air conditioner uses an AC power source when driving a ventilation fan, a motor and the like, and uses a DC power source when driving a control board, a display panel, a communication board, and the like. Therefore, the indoor unit 40 of the air conditioner has to be provided with an AC converter for converting a voltage level of an AC power source into a level suitable for an internal load device, and an AC/DC converter for converting the AC power source into a DC power source.

Also, the outdoor unit 30 of the air conditioner uses an AC power source when driving the motor and a compressor, and uses a DC power source when driving the control board and communication board. Therefore, the outdoor unit 30 of the air conditioner also has to be provided with the AC converter and the AC/DC converter separately from the indoor unit 40.

In this way, conventional electric power devices use only an AC power source as a commercial power source, and thus there has been a problem in that an electric power device and an accessory device of the electric power device each have to be provided with an electric power converting device such as the AC converter and the AC/DC converter at a power source input terminal thereof.

In addition, electric power efficiency may be improved when a DC power source is supplied to a consumer as a commercial power source. But, conventionally, a DC power source of the ESS is also converted into an AC power source and supplied to the consumer, resulting in a problem such as a fall in both electric power use efficiency and electric power supply efficiency.

In line with higher utilization of the ESS, a DC power source in addition to an AC power source may be also supplied to a consumer in the future. Thus, electric power devices of the consumer are also required to be improved so that power source input terminals thereof are able to use both an AC power source and a DC power source.

SUMMARY OF THE INVENTION

An aspect of the present disclosure provides a power source input device for both AC/DC power sources that allows each of the electric power devices to utilize both AC and DC power sources as its own driving power source even when the AC power source or DC power source is selectively input to the electrical power devices as a commercial power source.

Another aspect of the present disclosure provides a power source input device for both AC/DC power sources that allows each switchboard to supply an AC power source of an electric power system or a DC power source of an energy storage system (ESS) directly to each consumer as a commercial power source without varying the AC power source or DC power source.

Still another aspect of the present disclosure provides a power source input device for both AC/DC power sources that allows one of the accessory devices that receives an AC power source or a DC power source to share a varied DC power source in parallel with the other accessory devices even when the AC power source or the DC power source is selectively input to each of the electrical power devices as a commercial power source.

The power source input device for both AC/DC power sources according to embodiments of the present disclosure may include a first power source input unit that coverts an AC or DC commercial power source selectively input from the outside into a DC driving power source and supplies the converted DC driving power source to another accessory device. Such a configuration of the first power source input unit may allow each of the electric power devices to utilize both AC power source and DC power source as its own driving power source.

Further, the power source input device for both AC/DC according to embodiments of the present disclosure may include a second power source input unit that is provided in another accessory device to supply a DC driving power source supplied from the first power source input unit to at least one load. Here, the first power source input unit may include an AC/DC conversion circuit and an output circuit of the DC driving power source, and the second power source input unit may include only the output circuit that uses the DC driving power source of the first power source input unit in parallel.

Further, the power source input device for both AC/DC power sources according to embodiments of the present disclosure may use a DC power source input from the outside through the first power source input unit and an AC power source from the outside through the second power source input unit. In particular, each electric power device may convert the electric power selectively input from an AC or DC commercial power source into a DC driving power source, and then use the DC driving power source in parallel.

The power source input device for both AC/DC power sources according to embodiments of the present disclosure may allow each of the electric power devices to utilize both AC and DC power sources as its own driving power source, thereby simplifying a configuration of a power source input terminal of each of the electric power devices and reducing a manufacturing cost thereof.

Further, the power source input device for both AC/DC power sources according to embodiments of the present disclosure may directly use a DC power source input from the outside such as the ESS without varying the DC power source, thereby improving DC power source use efficiency. In particular, it is possible to further enhance utilization efficiency of a switchboard by reducing a load of the switchboard for varying a DC power source to an AC power source.

Further, the power source input device for both AC/DC power sources according to embodiments of the present disclosure may selectively receive an AC power source or a DC power source separately for each of the electrical power devices or each of the accessory devices. In particular, even when an AC commercial power source or a DC commercial power source is separately input, the DC driving power source may be shared in parallel, thereby simplifying an overall configuration of a power source input terminal circuit, and reducing constituent elements and a manufacturing cost of the power source input terminal.

DETAILED DESCRIPTION OF EXEMPLARY EMBODIMENTS

Embodiments illustrated herein are suggested only by way of an example but do not represent all technical concepts of the present disclosure. Therefore, it should be understood that there may be various equivalents and modifications which may replace the embodiments described at the time of filing of the present application. Further, all terms used in the description are terms that are defined in consideration of their functions in the present disclosure, and may differ depending on intentions of a user or an operator or customs. Accordingly, they should be defined on the basis of the contents of the whole description of the present disclosure.

Figure 2:
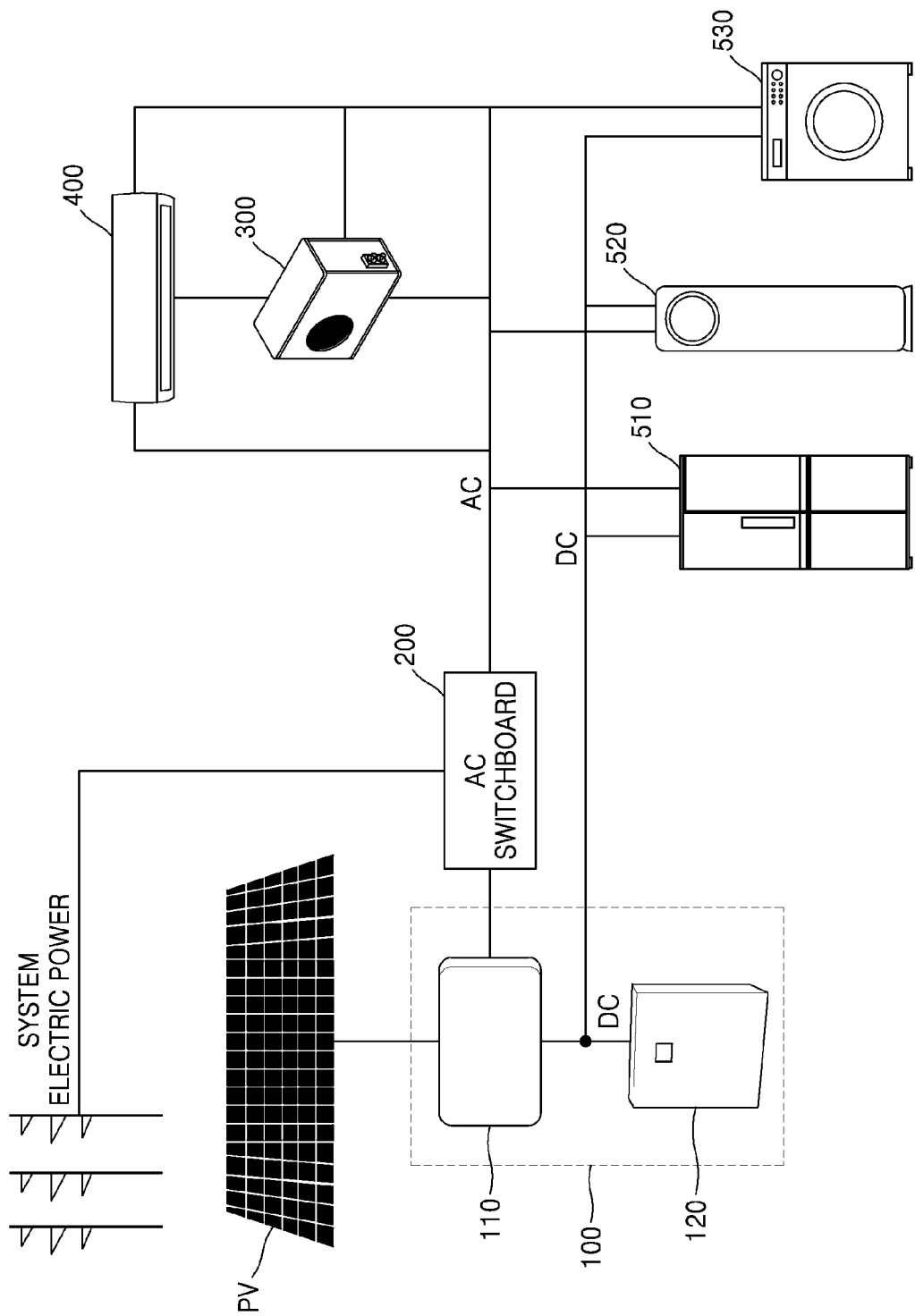
FIG. 2 illustrates commercial power input structures of home appliances each having a power source input device for both AC/DC power sources according to an embodiment of the present disclosure.

FIG. 2 illustrates commercial power input structures of home appliances each having a power source input device for both AC/DC power sources according to an embodiment of the present disclosure.

Referring to FIG. 2, each consumer may receive system electric power of alternating current (AC) from an electric power system through an AC switchboard 200. The AC switchboard 200 may transform the system electric power into an AC power source that is at a commercial power supply level, and may transfer the AC power source to each consumer.

An energy storage system (ESS) 100 may include an electric power control unit 110 and a battery 120, and store electric power generated by a solar panel PV or the like in the battery 120. And, direct current (DC) power stored in the battery 120 may be supplied to a consumer according to the control of the electric power control device 110.

Electric power devices 300, 400, 510, 520 and 530 of the consumer may be provided with a power source input device for both AC/DC power sources. That is, power source input terminals of the electric power devices 300, 400, 510, 520 and 530 and accessory devices of the electric power devices each may be provided with the power source input device for both AC/DC power sources, and the power source input device may selectively receive an AC power source or a DC power source and use the received power as a driving power source. The electric power devices 300, 400, 510, 520 and 530 may be an indoor unit 400 and an outdoor unit 300 of an air conditioner, a refrigerator 510, a sound device 520, a washing machine 530, and the like.

Figure 3:
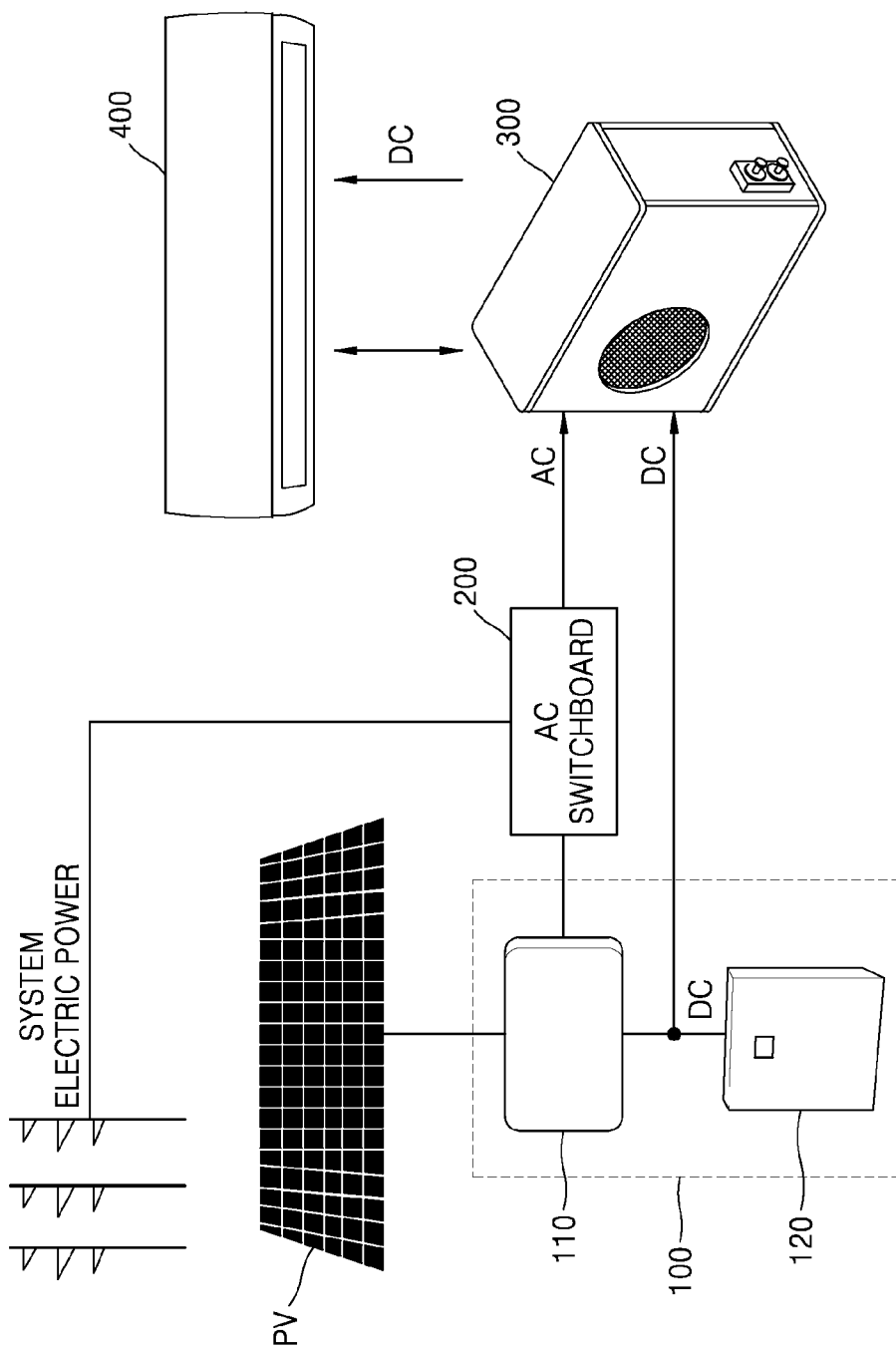
FIG. 3 illustrates a commercial power input structure of an air conditioner having a power source input device for both AC/DC power sources according to a first embodiment of the present disclosure.

FIG. 3 illustrates a commercial power input structure of an air conditioner having a power source input device for both AC/DC power sources according to a first embodiment of the present disclosure.

With reference to FIG. 3, an air conditioner will be described as an example of the electric power devices 300 and 400 of the consumer. In general, the air conditioner may include the indoor unit 400 and the outdoor unit 300. The power source input device according to embodiments of the present disclosure may be provided separately in each of the indoor unit 400 and the outdoor unit 300 that is an accessory device of the indoor unit 400.

The power source input device according to embodiments of the present disclosure may selectively receive an AC power source or a DC power source through any one power source input terminal even when the power source input device is provided separately in each of the electric power devices such as the indoor unit 400 and the accessory device such as the outdoor unit 300. And, the outdoor unit 300 or the indoor unit 400 may generate a DC level driving power source from the selectively input AC power source or DC power source, and share the DC level driving power source with each other.

For example, when the power source input terminal of the outdoor unit 300 receives an AC power source as a commercial power source, the power source input terminal of the outdoor unit 300 may generate a DC level driving power source from the AC power source and share the DC level driving power source with the indoor unit 400.

Even when the power source input terminal of the outdoor unit 300 receives a DC power source as a commercial power source, the power source input terminal of the outdoor unit 300 may generate a DC level driving power source from the DC power source and share the DC level driving power source with the indoor unit 400.

Therefore, the outdoor unit 300 may be provided with an AC/DC conversion circuit for selectively receiving an AC power source or a DC power source and converting the received power source into a DC driving power source, and an output circuit of the DC driving power source. The indoor unit 400 may be provided only with a DC circuit capable of utilizing the DC driving power source.

Figure 1:
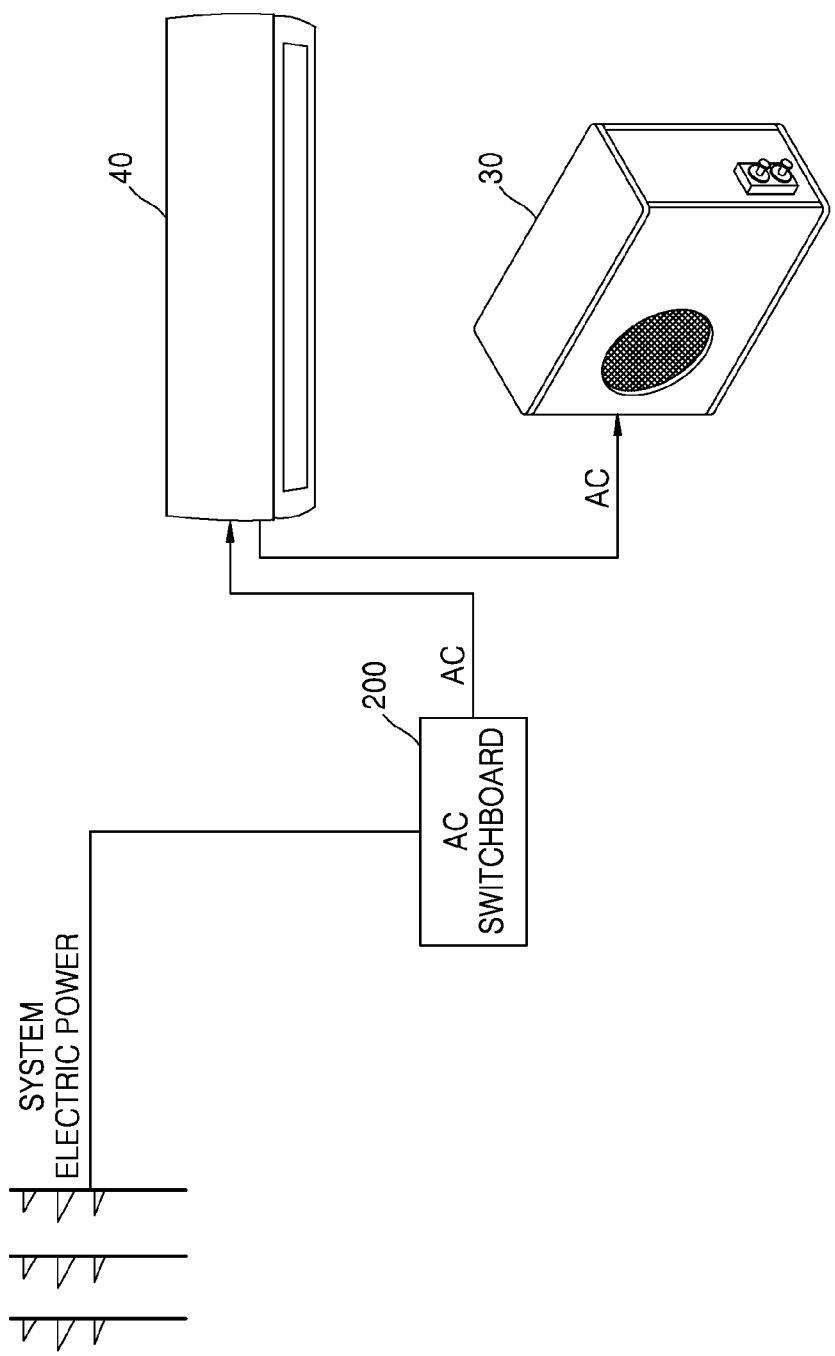
FIG. 1 is a block diagram illustrating an AC power source input structure of a home appliance according to the related art.
Figure 4:
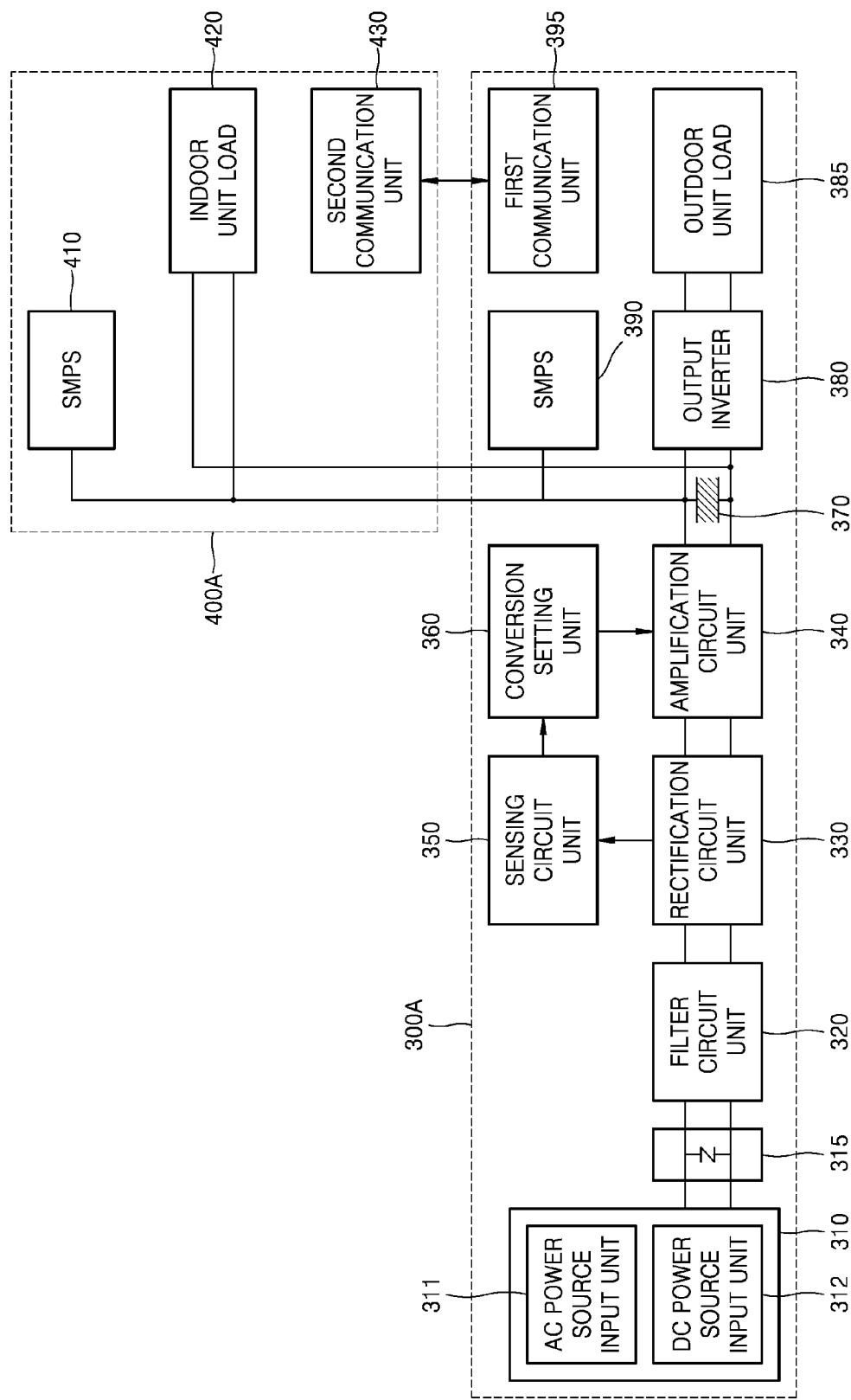
FIG. 4 is a block diagram specifically illustrating a configuration of a power source input device for both AC/DC power sources provided in the air conditioner of FIG. 1.

FIG. 4 is a block diagram specifically illustrating a configuration of a power source input device for both AC/DC power sources provided in the air conditioner of FIG. 1.

The power source input device illustrated in FIG. 4 may include a first power source input unit 300A provided at a power source input terminal of the outdoor unit 300 of the air conditioner and a second power source input unit 400A provided at a power source input terminal of the indoor unit 400 of the air conditioner.

FIG. 4 illustrates an example in which the first power source input unit 300A is provided in the outdoor unit 300 of the air conditioner and the second power source input unit 400A is provided in the indoor unit 400 of the air conditioner, but positions of the first power source input unit 300A and the second power source input unit 400A may be interconverted or changed. In addition, not only to the air conditioner but also to other home appliances, office appliances, or industrial appliances are applicable as an example of the electric power device.

When the first power source input unit 300A is provided in the outdoor unit 300 of the air conditioner and an AC or DC power source is input to the outdoor unit 300 of the air conditioner, the first power source input unit 300A may be provided with the AC/DC conversion circuit for converting the AC or DC power source into a DC driving power source, and the output circuit.

On the other hand, the second power source input unit 400A provided in the indoor unit 400 of the air conditioner may be provided only with the DC circuit for using the DC driving power source shared by the first power source input unit 300A.

Specifically, the first power source input unit 300A may be provided at a power source input terminal of the outdoor unit 300 of the air conditioner to convert an AC or DC commercial power source input selectively from the outside into a DC driving power source. And, the first power source input unit 300A may supply the converted DC driving power source to a self load while supplying the DC driving power source to another accessory electric power device.

The second power source input unit 400A may be provided in another electric power device or accessory electric power device, that is, the indoor unit 400 of the air conditioner, to supply the DC driving power source supplied from the first power source input unit 300A to a self load.

For this purpose, the first power source input unit 300A may include a power source input unit 310, a stabilization circuit unit 315, a filter circuit unit 320, a rectification circuit unit 330, an amplification circuit unit 340, a smoothing capacitor 370, and an output inverter 380. Also, the first power source input unit 300A may further include a sensing circuit unit 350, a conversion setting unit 360, a SMPS (Switched-Mode Power Supply) 390, and a first communication unit 395.

The power source input unit 310 may selectively receive an AC or DC commercial power source from the outside. The power source input unit 310 may include an AC power source input unit 311 that receives an AC power source through an AC power source input cord and a DC power source input unit 312 that receives a DC power source through a DC power source input cord. The power source input unit 310 may supply a power source input through the AC power source input cord or DC power source input cord, that is, an AC or DC commercial power source to the filter circuit unit 320. When a power source is input through both the AC power source input cord and the DC power source input cord, only the power source that is input earlier may be supplied to the filter circuit unit 320. On the other hand, when a power source is input at the same time, a preset power source, for example, only a DC power source input through the DC power source input cord, may be supplied to the filter circuit unit 320.

The stabilization circuit unit 315 may include at least one stabilizing fuse, a capacitor, and a resistance circuit to reduce the risk of an overload and an overvoltage of the AC or DC commercial power source input from the power source input unit 310.

The filter circuit unit 320 may filter the AC or DC commercial power source supplied from the power source input unit 310 through the stabilization circuit unit 315 to remove a noise. And, the filter circuit unit 320 may be transfer the AC or DC commercial power source from which the noise is removed to the rectification circuit unit 330. The filter circuit unit 320 may be configured to attenuate an EMI or EMC noise of the power source. The filter circuit unit 320 may correspond to the AC and DC commercial power sources in common. Alternatively, the filter circuit unit 320 may correspond to each of the AC and DC commercial power sources. In this case, the filter circuit unit 320 may be connected in parallel to each of the AC and DC commercial power sources. AC and DC noise filter circuits may correspond to AC and DC commercial power sources, respectively.

The rectification circuit unit 330 may rectify the AC or DC commercial power source filtered by the filter circuit unit 320 and supply the rectified AC or DC commercial power source to the amplification circuit unit 340.

The amplification circuit unit 340 may perform a boost converting operation to amplify the AC or DC commercial power source rectified by the rectification circuit unit 330 so that an average voltage thereof is raised even when there is a ripple.

The sensing circuit unit 350 may sense the AC or DC commercial power source rectified by the rectification circuit unit 330 and transfer a result of sensing whether the commercial power source rectified by the rectifying circuit unit 330 is an AC commercial power source or a DC commercial power source to the conversion setting unit 360.

When the commercial power source sensed by the sensing circuit unit 350 is an AC commercial power source, the conversion setting unit 360 may apply a switching signal to the amplification circuit unit 340 so that the amplification circuit unit 340 performs the boost converting operation. On the other hand, when the commercial power source sensed by the sensing circuit unit 350 is a DC commercial power source, the conversion setting unit 360 may turn off the switching signal so that the amplification circuit unit 340 does not perform the boost converting operation.

Figure 5:
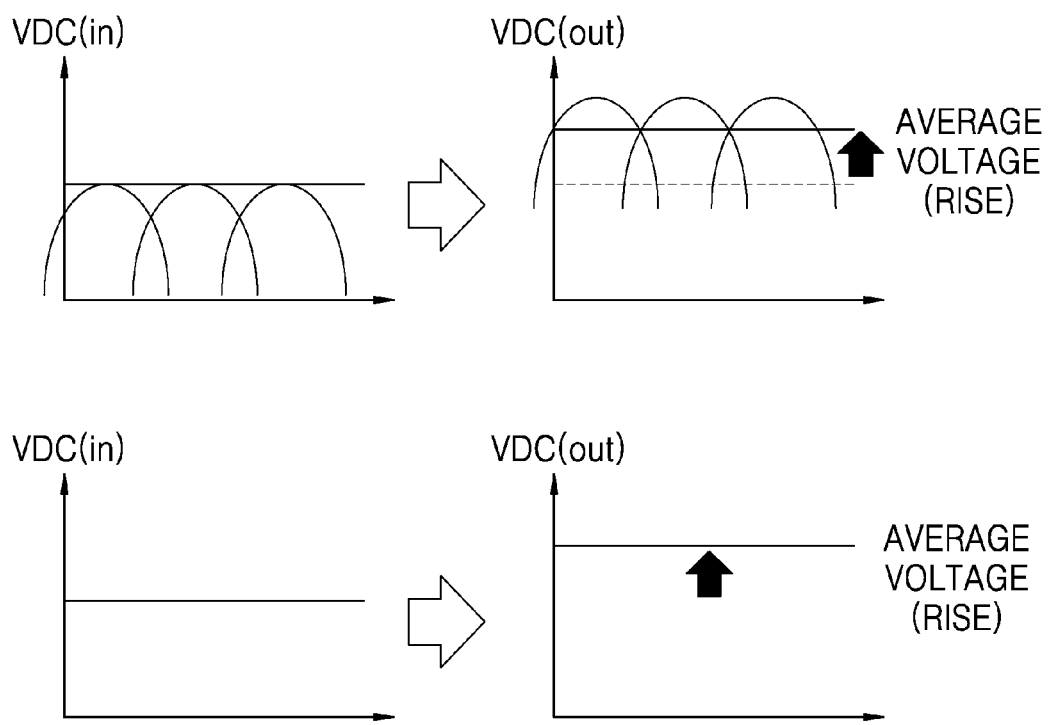
FIG. 5 is a waveform diagram illustrating a voltage state that varies depending on the AC/DC converting structure of FIG. 4.

FIG. 5 is a waveform diagram illustrating a voltage state that varies depending on the AC/DC converting structure of FIG. 4.

As illustrated in FIG. 5, when the commercial power source sensed by the sensing circuit unit 350 is an AC commercial power source, the amplification circuit unit 340 may perform the boost converting operation, and as a result, an average voltage of the AC commercial power source may be raised. That is, when the AC commercial power source is input, an average voltage of the AC commercial power source is raised, and accordingly the AC commercial power source with the raised voltage may be used as a voltage for power factor correction, or used in a converter mode for raising an average voltage.

And, when the commercial power source sensed by the sensing circuit unit 350 is a DC commercial power source, the amplification circuit unit 340 may turn off the switching signal so that the boost converting operation is not performed. On the other hand, when the DC commercial power source is input as the commercial power source, the boost converting operation of the amplification circuit unit 340 may not be performed. Thus, when the DC commercial power source is input as the commercial power source, the conversion setting unit 360 may stop the boost converting operation of the amplification circuit unit 340, thereby reducing a loss resulting from the boost converting operation.

When the input commercial power source is a DC power source, the conversion setting unit 360 may determine whether a voltage of the DC power source is greater than or less than a threshold voltage required for driving a outdoor unit load 385 such as a motor, and may control the amplification circuit unit 340 to operate as a boost converter or not based on a result of the previous determination.

The smoothing capacitor 370 may smooth the AC or DC commercial power source amplified by the amplification circuit unit 340 and output the smoothed DC driving power source. That is, the smoothing capacitor 370 that is connected to the amplification circuit unit 340 in parallel may be charged or discharged at a predetermined voltage level by an output of the amplification circuit unit 340, and as a result, a current waveform of the AC or DC commercial power source may be smoothed. Therefore, finally, the smoothing capacitor 370 may output the DC driving power source.

An electrolytic capacitor having a large capacity (about 680 µF to 2000 µF) was used as a smoothing capacitor of a general AC commercial power source input terminal to which no DC commercial power source inputs. However, the power source input device according to embodiments of the present disclosure that receives both AC and DC commercial power sources to perform a boost converting operation may use a film type capacitor having a small capacity (about 5 µF to 30 µF).

In the case of using the film type capacitor, it is preferable to use a capacitor having a small capacity which does not require an initial charging circuit. A converting device such as a smoothing capacitor having a large capacity has to be provided with the initial charging circuit for initially charging the capacitor. That is, the capacitor having a large capacity may have low resistance when an initial power source is input, and thus an excessive amount of current may be input when the initial power source is input.

In order to prevent an overcurrent from being applied, the initial charging circuit including a resistance element and a switch had to be provided at the power source input terminal. However, according to embodiments of the present disclosure, the initial charging circuit does not have to be provided even when an AC voltage is input as a commercial power source, and it is possible to lower a capacity of the smoothing capacitor 370.

The output inverter 380 may supply the DC driving power source to an outdoor unit load 385 that is a self load such as a fan, a motor or a compressor so that the outdoor unit load 385 is selectively driven.

The SMPS 390 including a DC/DC converter may convert a voltage level of the DC driving power source to be suitable for driving a control board, a display device, and the first communication unit 395, and supply the converted DC driving power source to the control board, the display device, and the first communication unit 395.

The first communication unit 395 may share control information of the outdoor unit 300 including the control board and the display device with the indoor unit 400.

The second power source input unit 400 may include a second communication unit 430 and a second SMPS 410. The second communication unit 430 of the second power source input unit 400A may share control information of indoor unit load devices including the first communication unit 395 of the first power source input unit 300A, a ventilation fan, the control board and the display device.

The second SMPS 410 may convert the DC driving power source input from the first power source input unit 300A in accordance with driving voltages of the control board and the display device to supply the converted DC driving power source to the control board and the display device.

Figure 6:
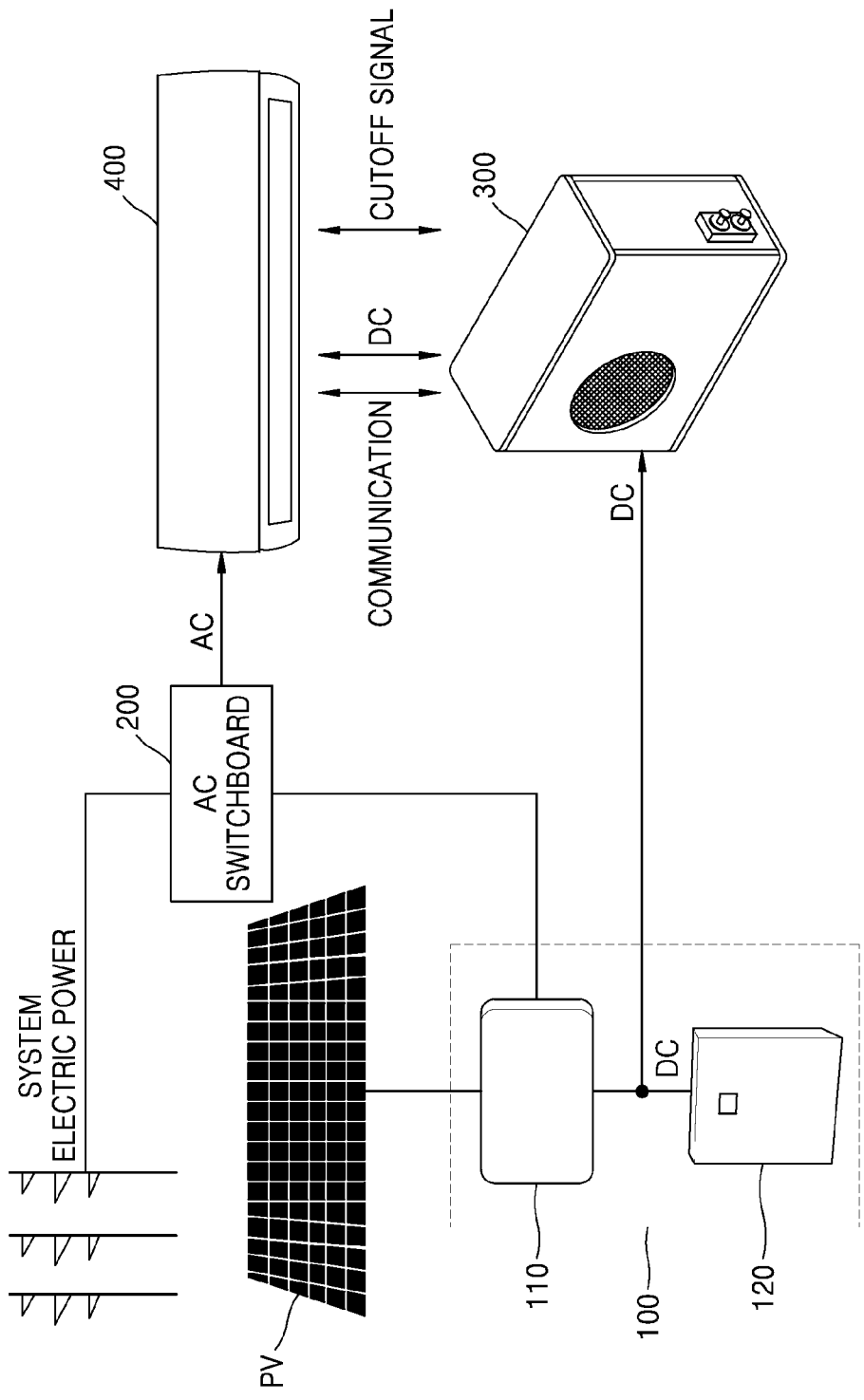
FIG. 6 illustrates a commercial power source input structure of an air conditioner having a power source input device for both AC/DC power sources according to a second embodiment of the present disclosure.

FIG. 6 illustrates a commercial power input structure of an air conditioner having a power source input device for both AC/DC power sources according to a second embodiment of the present disclosure.

Referring to FIG. 6, each consumer may receive an AC power source that is at a commercial power source level through the AC switchboard 200, and a DC power source through the ESS 100.

At this time, the power source input unit for both AC/DC power sources may be provided at power source input terminals of electric power devices 300 and 400 of the consumer or accessory devices that constitute the electric power devices, and may selectively receive an AC power source or a DC power source and use the received power source as a driving power source.

The air conditioner may be described as an example of the electric power devices 300 and 400 of the consumer. The indoor unit 400 may receive an AC commercial power source input through the AC switchboard 200, and the outdoor unit 300 may receive a DC commercial power source from the ESS 100.

Figure 7:
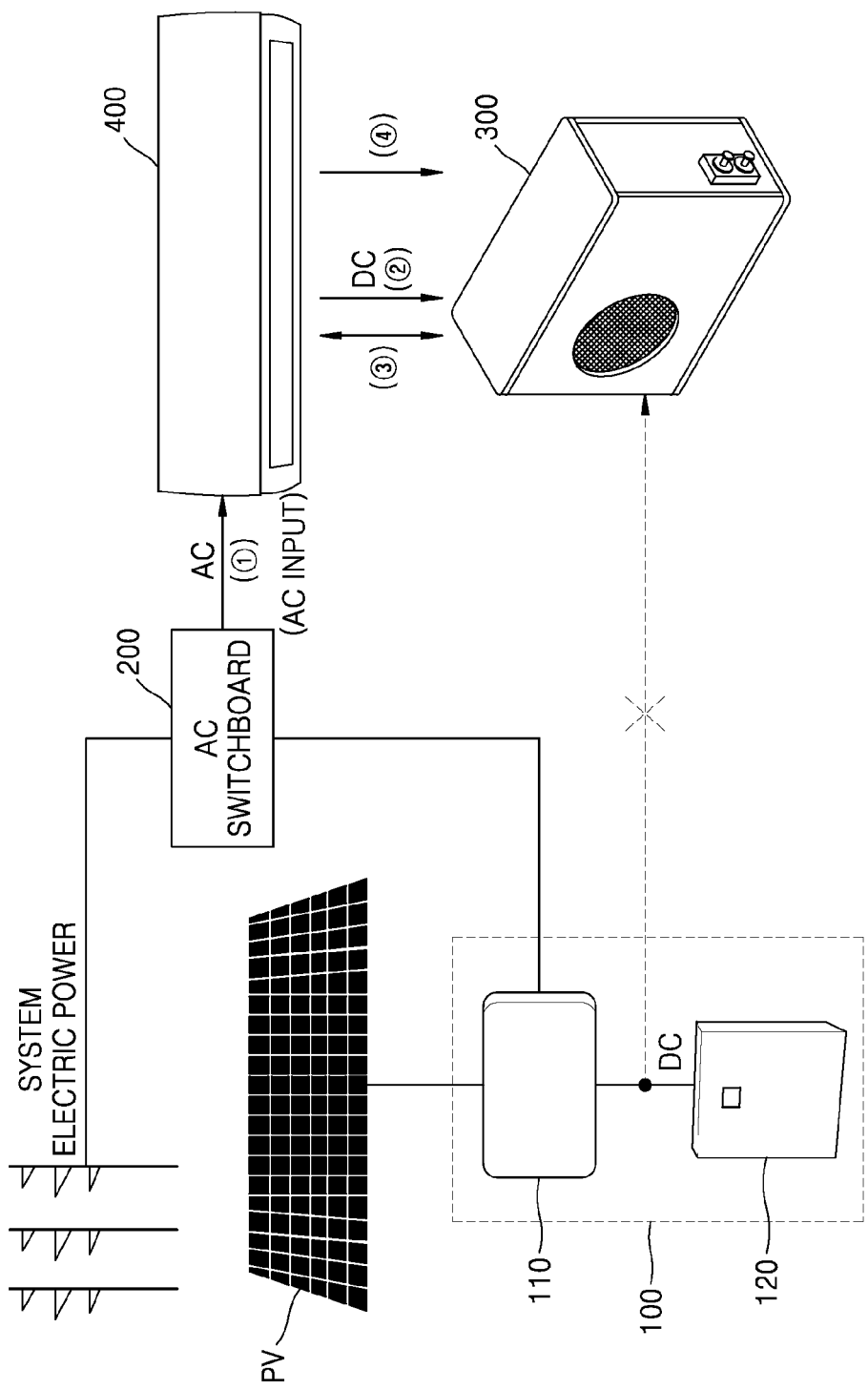
FIG. 7 illustrates a procedure of transferring and sharing a commercial power source in a state where an AC commercial power source is input to an indoor unit of the air conditioner illustrated in FIG. 6.

FIG. 7 illustrates a procedure of transferring and sharing a commercial power source in a state where an AC commercial power source is input to an indoor unit of the air conditioner illustrated in FIG. 6.

As illustrated in FIG. 7, when an AC power source is input to the power source input terminal of the indoor unit 400 as the commercial power source (①), a DC level driving power source may be generated from the AC power source, and the DC level driving power source may be shared with the outdoor unit 300 (②). That is, the indoor unit 400 may receive the AC power source as the commercial power source, and convert the AC power source into a DC driving power source for use.

At this time, the converted DC driving power source may be also supplied to the outdoor unit 300. The indoor unit 400 and the outdoor unit 300 may communicate with each other through a communication line (③), and thus the indoor unit 400 may generate and share a cutoff signal so that the outdoor unit 300 does not generate an additional DC driving power source (④). A feature of a cutoff signal transmitting/receiving technology of the indoor unit 400 and the outdoor unit 300 will be described in detail with reference to the following drawings.

Figure 8:
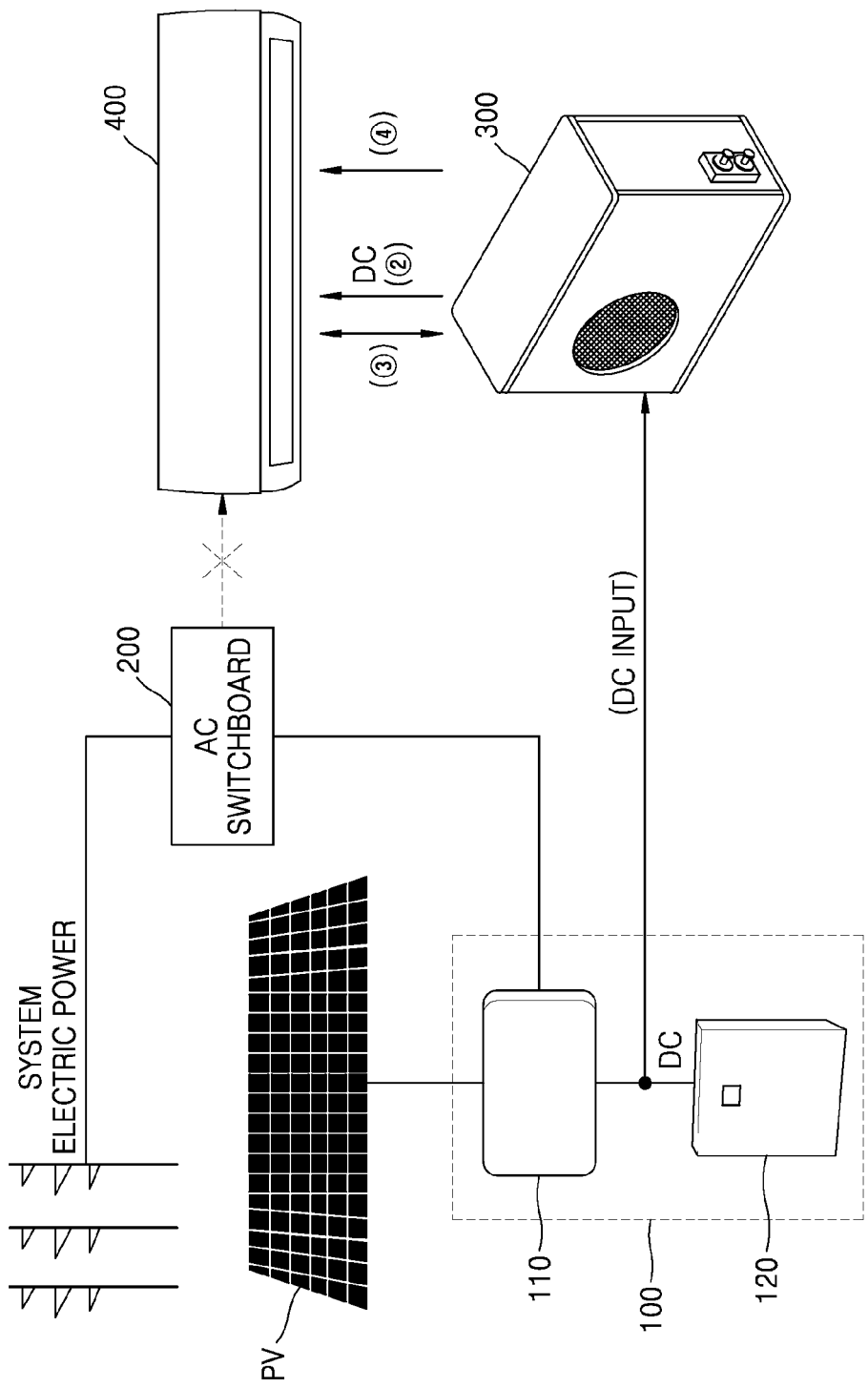
FIG. 8 illustrates a procedure of transferring and sharing a commercial power source in a state where a DC commercial power source is input to an indoor unit of the air conditioner illustrated in FIG. 6.

FIG. 8 illustrates a procedure of transferring and sharing a commercial power source in a state where a DC commercial power source is input to an indoor unit of the air conditioner illustrated in FIG. 6.

As illustrated in FIG. 8, when a DC commercial power source is input to the power source input terminal of the outdoor unit 300, the outdoor unit 300 may generate DC level driving power source from the DC commercial power source, and share the DC level driving power source with the indoor unit 400 (①). That is, when the DC commercial power source is input to the power source input terminal of the outdoor unit 300, the DC commercial power source may be directly used as the DC driving power source, or a voltage level of the DC commercial power source may be varied to be used as the DC driving power source.

At this time, the DC driving power source may be supplied to the indoor unit 400 to be used in parallel (②). The outdoor unit 300 and the indoor unit 400 may communicate with each other through a communication line (③), and the outdoor unit 300 may generate and share a switching signal to prevent the indoor unit 400 from generating additional DC driving power source.

Therefore, the indoor unit 400 may be provided with an AC/DC conversion circuit for receiving AC power source and converting the AC power source into DC driving power source, and an output circuit for DC driving power source. The outdoor unit 400 may be provided only with a DC circuit capable of utilizing the DC driving power source.

Figure 9:
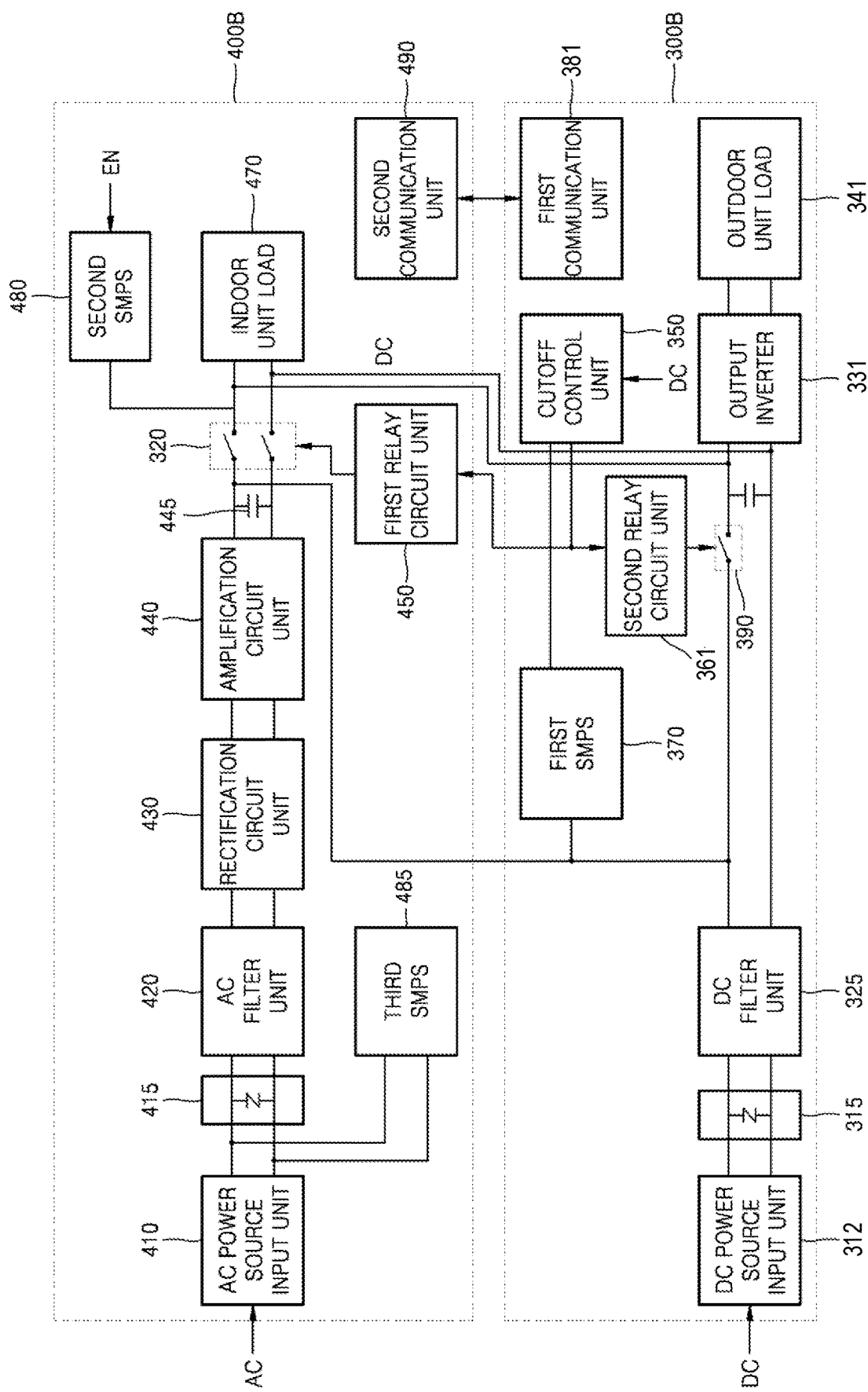
FIG. 9 is a block diagram specifically illustrating a configuration of a power source input device for both AC/DC power sources provided in the air conditioner of FIG. 6.

FIG. 9 is a block diagram specifically illustrating a configuration of a power source input device for both AC/DC provided in the air conditioner of FIG. 6.

The power source input device illustrated in FIG. 9 may include a first power source input unit 300B provided at a power source input terminal of the outdoor unit 300 of the air conditioner and a second power source input unit 400B provided at a power source input terminal of the indoor unit 400 of the air conditioner.

FIG. 9 illustrates an example in which the first power source input unit 300B is provided in the outdoor unit 300 of the air conditioner and the second power source input unit 400B is provided in the indoor unit 400 of the air conditioner, but positions of the first power source input unit 300B and the second power source input unit 400B may be interconverted or changed.

When a DC commercial power source is input to the outdoor unit 300 of the air conditioner, the first power source input unit 300B may be provided with an output circuit for converting the DC commercial power source into a DC driving power source to supply the converted DC driving power source to a second power source input unit, and a cutoff circuit for cutting off the second power source input unit 400B.

When an AC commercial power source is input to the indoor unit 400 of the air conditioner, the second power source input unit 400B may be provided with an AC/DC conversion circuit for converting the AC commercial power source into DC driving power source and a DC driving power source output circuit.

Specifically, the first power source input unit 300B may be provided at the power source input terminal of the outdoor unit 300 of the air conditioner to convert the DC commercial power source which is input to the outdoor unit 300 of the air conditioner into a DC driving power source. And, the first power source input unit 300B may supply the DC driving power source to another accessory electric power device such as the indoor unit 400 of the air conditioner while supplying the converted DC driving power source to a self load.

In addition, when converting a DC commercial power source into a DC driving power source for use, the first power source input unit 300B may generate a cutoff signal for cutting off the second power source input unit 400B, and supply the cutoff signal to the second power source input unit 400B. Therefore, both the outdoor unit 300 and the indoor unit 400 of the air conditioner may use the DC commercial power source.

On the other hand, when an AC commercial power source is input to the indoor unit 400 of the air conditioner, the second power source input unit 400B may convert the AC commercial power source into a DC driving power source. And, the second power source input unit 400B may supply the DC driving power source to another accessory electric power device such as the first power source input unit 300B while supplying the converted DC driving power source to a self load 470.

Specifically, referring to FIG. 9, the first power source input unit 300B may include a DC power source input unit 312, a DC stabilization circuit unit 315, a DC filter unit 325, a first SMPS 370, an inverter 331, a cutoff control unit 350, a second relay circuit unit 361, and a first communication unit 381.

The DC power source input unit 310 may be provided with a DC input cord to receive a DC commercial power source from the outside through the DC input cord, and transfer the DC commercial power source to the DC filter unit 325.

The DC stabilization circuit unit 315 may be provided with at least one stabilizing fuse, a capacitor, and a resistance circuit to reduce the risk of an overload and an overvoltage of the DC commercial power source input from the power source input unit 310.

The DC filter unit 325 may filter the DC commercial power source input from the DC power source input unit 312 through the DC stabilization circuit unit 315 to remove a noise. And, the DC commercial power source from which the noise is removed may be transferred to the inverter 331 and the second power source input unit 400B.

The inverter 331 may convert a voltage level of the DC driving power source input through the DC filter unit 325 and supply the converted DC driving power source to a self load such as an outdoor unit load 341.

When DC commercial power source is input, the cutoff control unit 350 may cutoff other accessory electric power devices including the second power source input unit 400B so as not to generate and output an additional DC commercial power source. For this purpose, when the DC commercial power source is input from the outside or the DC power source input unit 310, the cutoff control unit 350 may generate a cutoff signal and supply the cutoff signal to the second power source input unit 400B and other accessory electric power devices. The second power source input unit 400B and the like may be cut off by the cutoff control signal, and as a result, the generation of the DC commercial power source may be stopped.

The second relay circuit unit 361 may be used when the first power source input unit 300B is cut off. When an additional cutoff signal is input from the cutoff control unit 350, the second relay circuit unit 361 may interrupt the first power source input unit 300B itself from outputting a DC driving power source.

The first SMPS 370 may be configured to apply an operating power source to the cutoff control unit 350 in real time. For this purpose, the first SMPS 370 may be provided with a DC/DC converter, and may receive a DC driving power source from both the DC filter unit 325 and the second power source input unit 400B and supply the DC driving power source as an operating power source (or, a control power source) of the cutoff control unit 350.

The first communication unit 381 may share control information of the outdoor unit 300 including the control board and the display unit with the indoor unit 400.

The second power source input unit 400B may include an AC power source input unit 410, an AC stabilization circuit unit 415, an AC filter unit 420, a rectification circuit unit 430, an amplification circuit unit 440, a smoothing capacitor 445, a first relay circuit unit 450, a cutoff switching unit 320, a second SMPS 480, a third SMPS 480, and a second communication unit 490.

The AC power source input unit 410 may selectively receive an AC commercial power source from the outside. The AC power source input unit 410 may receive the AC commercial power source through the AC power source input cord, and supply the AC commercial power source to the AC filter unit 420.

The AC stabilization circuit unit 315 may be provided with at least one stabilizing fuse, a capacitor, and a resistance circuit to reduce the risk of an overload and an overvoltage of the AC commercial power source input from the power source input unit 310.

The AC filter unit 420 may filter the AC commercial power source supplied from the AC power source input unit 410 through the AC stabilization circuit unit 415 to remove a noise. The AC commercial power source from which the noise is removed may be transferred to the rectification circuit unit 430. The AC filter unit 420 may be configured to attenuate an EMI or EMC noise of the AC commercial power source.

The rectification circuit unit 430 may rectify the AC commercial power source filtered by the AC filter unit 420 and supply the rectified AC commercial power source to the amplification circuit unit 440.

The amplification circuit unit 440 may perform a boost converting operation to amplify the AC commercial power source rectified by the rectification circuit unit 430 so that an average voltage thereof is raised even when there is a ripple.

The smoothing capacitor 445 may smooth the AC commercial power source amplified by the amplification circuit unit 440 and output the smoothed DC driving power source. That is, the smoothing capacitor 445 that is connected to the amplification circuit unit 440 in parallel may be charged and discharged at a predetermined voltage level by an output of the amplification circuit unit 440, and as a result, a current waveform of the AC commercial power source may be smoothed. Therefore, finally, the smoothing capacitor 445 may output the DC driving power source.

The first relay circuit unit 450 may turn on/off the cutoff switching unit 320 according to the control of the cutoff control unit 350 provided in the first power source input unit 300B. When a DC commercial power source is input to the first power source input unit 300B, and accordingly the cutoff control unit 350 generates a cutoff signal, the first relay circuit unit 450 may turn off the cutoff switching unit 320 in response to the cutoff signal. In this case, the second power source input unit 400B may use the DC commercial power source supplied from the first power source input unit 300B for the indoor unit load 470 and the second SMPS 480.

When the DC commercial power source is not input to the first power source input unit 300B, and accordingly the cutoff control unit 350 does not generate the cutoff signal, the DC driving power source converted by the second power source input unit 400B may be supplied to the inverter 330 of the first power source input unit 300B.

The second SMPS 480 including a DC/DC converter may convert a voltage level of the DC driving power source to be suitable for driving the control board, the display device, and the second communication unit 490, and supply the converted DC driving power source to the control board, the display device, and the second communication unit 490.

The third SMPS 485 may generate an initial driving voltage when an AC commercial power source is input. When the AC commercial power source is input and accordingly the third SMPS 485 operates, the third SMPS 485 may transfer an enable signal to the second SMPS 480 so that only one of the second SMPS or the third SMPS operates.

As described above, the power source input device for both AC/DC power sources according to embodiments of the present disclosure may allow each of the electric power devices to utilize both AC and DC power sources as its own driving power source, thereby simplifying a configuration of a power source input terminal of each of the electric power devices and reducing a manufacturing cost thereof.

Further, the power source input device for both AC/DC power sources according to embodiments of the present disclosure may directly use a DC power source input from the outside such as the ESS without varying the DC power source, thereby improving DC power source use efficiency. In particular, it is possible to further enhance utilization efficiency of a switchboard by reducing a load of the switchboard for varying a DC power source to an AC power source.

Further, the power source input device for both AC/DC power sources according to embodiments of the present disclosure may selectively receive an AC power source or a DC power source separately for each of the electrical power devices or each of the accessory devices. In particular, even when an AC commercial power source or a DC commercial power source is separately input, the DC driving power source may be shared in parallel, thereby simplifying an overall configuration of a power source input terminal circuit, and reducing constituent elements and a manufacturing cost of the power source input terminal.

The present disclosure is described with reference to embodiments illustrated in the drawings, but the embodiments are merely exemplary. It should be apparent to those skilled in the art that various substitutions, changes and modifications which are not exemplified herein but are still within the spirit and scope of the present disclosure may be made. Therefore, the scope of the present disclosure is defined not by the detailed description, but by the claims.

What is claimed is:

1. A power source input device for both alternating current (AC) and direct current (DC) power sources, comprising:
    a first power source input unit that is provided at a power source input terminal of an electric power device to convert an AC or DC commercial power source selectively input from the outside of the first power source input unit into a DC driving power source and supply the converted DC driving power source to an accessory device; and
    a second power source input unit that is provided in the accessory device to supply the DC driving power source supplied from the first power source input unit to at least one load,
    wherein the first power source input unit comprises:
    a power source input unit that receives the AC or DC commercial power source;
    a filter circuit unit that filters the AC or DC commercial power source;
    a rectification circuit unit that rectifies the filtered AC or DC commercial power source;
    an amplification circuit unit that amplifies a voltage of the rectified AC or DC commercial power source;
    a smoothing capacitor that smoothes the amplified AC or DC commercial power source so that a DC driving power source is output;
    an output converter that supplies the DC driving power source to a self load,
    a sensing circuit unit that senses the AC or DC commercial power source rectified by the rectification circuit unit to output whether the rectified commercial power source is an AC commercial power source or a DC commercial power source; and
    a conversion setting unit that applies a switching signal to the amplification circuit unit so that the amplification circuit unit performs a boost converting operation when the AC commercial power source is sensed, and that turns off the switching signal so that the amplification circuit unit does not perform the boost converting operation when the DC commercial power source is sensed.

2. The power source input device of claim 1,
    wherein the first power source input unit is provided with at least one AC/DC conversion circuit and an output circuit of the DC driving power source, and
    wherein the second power source input unit is provided with a DC circuit to supply the DC driving power source to the at least one load.

3. The power source input device of claim 1,
    wherein the power source input device comprises:
    an AC power source input unit that receives an AC power source through an AC power source input cord; and
    a DC power source input unit that receives a DC power source through a DC power source input cord.

4. The power source input device of claim 1,
    wherein the smoothing capacitor comprises a film type capacitor that has a capacity ranging from 5 µF to 30 µF to smooth the amplified AC or DC commercial power source so that a DC driving power source is output.

5. The power source input device of claim 1,
    wherein, when the sensing circuit unit senses a DC commercial power source, the conversion setting unit determines whether a voltage of the sensed DC commercial power source is greater than or less than a threshold voltage required for driving a motor or an outdoor unit load, and outputs the switching signal so that the amplification circuit unit operates or does not operate as a boost converter based on a result of the determination.

6. The power source input device of claim 1,
    wherein the second power source input unit comprises:
    a second communication unit that shares control information of a first communication unit of the first power source input unit, a ventilation fan, a control board and a display device; and
    a DC/DC converter that converts a DC driving power source input from the first power source input unit in accordance with driving voltages of the control board and the display device.

* * * * *